(12) United States Patent
Iellimo et al.

(10) Patent No.: US 11,390,460 B2
(45) Date of Patent: Jul. 19, 2022

(54) STORAGE SUPPORT MEMBER AND GRATING SYSTEM

(71) Applicant: FRAZIER INDUSTRIAL COMPANY, Long Valley, NJ (US)

(72) Inventors: Domenick Iellimo, Forked River, NJ (US); Aaron Iellimo, Califon, NJ (US)

(73) Assignee: Frazier Industrial Company, Long Valley, NJ (US)

(*) Notice: Subject to any disclaimer, the term of this patent is extended or adjusted under 35 U.S.C. 154(b) by 0 days.

(21) Appl. No.: 16/943,333

(22) Filed: Jul. 30, 2020

(65) Prior Publication Data

US 2021/0032025 A1 Feb. 4, 2021

Related U.S. Application Data

(60) Provisional application No. 62/882,115, filed on Aug. 2, 2019, provisional application No. 62/896,663, filed on Sep. 6, 2019, provisional application No. 62/983,967, filed on Mar. 2, 2020.

(51) Int. Cl.
*B65G 1/04* (2006.01)
*A47B 96/14* (2006.01)
*A47B 96/02* (2006.01)

(52) U.S. Cl.
CPC ............. *B65G 1/04* (2013.01); *A47B 96/021* (2013.01); *A47B 96/1441* (2013.01)

(58) Field of Classification Search
CPC .. A47F 5/01; B65G 1/04; A47B 47/00; A47B 47/021; A47B 96/021; A47B 96/02; A47B 96/20; A47B 96/1441
See application file for complete search history.

(56) References Cited

U.S. PATENT DOCUMENTS

| | | | | |
|---|---|---|---|---|
| 2,815,130 A | * | 12/1957 | Franks | E04G 1/14 211/191 |
| 2,960,238 A | * | 11/1960 | Russell | A47B 47/027 211/134 |
| 3,101,148 A | | 8/1963 | Brown | |
| 3,294,351 A | | 12/1966 | Rollins, Jr. | |
| 3,403,787 A | * | 10/1968 | Browning | A47B 61/003 211/124 |
| 3,701,325 A | | 10/1972 | Fenwick | |
| 3,773,184 A | * | 11/1973 | Brennan | A47B 61/003 211/123 |
| 4,078,664 A | * | 3/1978 | McConnell | A47B 96/00 108/159 |
| 4,122,955 A | | 10/1978 | Celms | |

(Continued)

*Primary Examiner* — Patrick D Hawn
(74) *Attorney, Agent, or Firm* — Dilworth & Barrese, LLP

(57) ABSTRACT

Warehouse support structures capable of supporting 3000 pounds or more are fastened to the inside surface of a horizontal support beam attached to a vertical column. A structural support member spans the horizontal support beams and support a platform, such as a mesh platform is supported thereon. The support member can be an inverted formed U or an angle beam. The angle beam should have an attachment bracket secured to each end, at a height to permit the platform to have the same height as the horizontal beam. The mesh platform should nest in the inside surface of the horizontal beam, between the support member and the beam. The construction presents a smooth, easy to assemble, snag free construction.

18 Claims, 16 Drawing Sheets

(56) References Cited

U.S. PATENT DOCUMENTS

| | | | |
|---|---|---|---|
| 4,558,647 A | 12/1985 | Petersen | |
| 4,603,781 A | 8/1986 | Ryan, Jr. | |
| 4,624,376 A | 11/1986 | Bertram | |
| 4,783,035 A | 11/1988 | Remmers | |
| 5,072,839 A | 12/1991 | Amone | |
| 5,251,973 A | 10/1993 | Hazan | |
| D378,481 S | 3/1997 | Oberhaus | |
| 5,779,069 A * | 7/1998 | Scully | A47B 96/02 211/153 |
| D408,665 S | 4/1999 | Von Gunten | |
| D418,342 S | 1/2000 | Von Gunten | |
| 6,173,847 B1 | 1/2001 | Zellner, III | |
| D445,617 S | 7/2001 | Von Gunten | |
| 6,286,691 B1 | 9/2001 | Oberhaus | |
| 6,749,208 B2 | 6/2004 | Orozco | |
| 6,913,235 B2 | 7/2005 | Oberhaus | |
| 6,918,498 B2 | 7/2005 | Sparkowski | |
| 7,188,740 B2 | 3/2007 | Marchetta | |
| D580,193 S | 11/2008 | Sparkowski | |
| 7,540,510 B2 | 6/2009 | Sparkowski | |
| 7,614,511 B2 * | 11/2009 | Konstant | A47B 47/021 211/189 |
| 7,857,152 B2 * | 12/2010 | Smith | A47B 96/00 211/187 |
| 8,025,163 B2 | 9/2011 | McAllister | |
| 8,123,001 B1 * | 2/2012 | Apostolopoulos | E04G 3/30 182/150 |
| 8,443,992 B2 * | 5/2013 | Lawson | A47B 47/028 211/190 |
| 8,695,816 B2 * | 4/2014 | Troyner | A47B 96/14 211/191 |
| 9,027,767 B2 * | 5/2015 | Buckley | A47B 47/0083 211/134 |
| 9,215,931 B1 * | 12/2015 | Offerman | A47B 96/02 |
| 9,375,102 B2 * | 6/2016 | Troyner | A47B 57/402 |
| 9,386,855 B2 * | 7/2016 | Sabounjian | A47B 96/14 |
| D781,063 S | 3/2017 | Shah | |
| 10,098,458 B2 | 10/2018 | Lindmark | |
| 10,214,351 B2 * | 2/2019 | Duppong | A47B 47/021 |
| 10,299,594 B2 * | 5/2019 | Liss | A47B 55/00 |
| 10,432,001 B1 | 10/2019 | Bellis | |
| 10,499,733 B2 | 12/2019 | Felsenthal | |
| 10,736,415 B1 * | 8/2020 | Iellimo | A47B 47/0083 |
| 10,745,198 B1 * | 8/2020 | Iellimo | A47B 47/028 |
| 10,806,251 B2 | 10/2020 | Liss | |
| 10,806,257 B1 * | 10/2020 | Liu | A47B 47/024 |
| 10,836,576 B2 * | 11/2020 | Duppong | B65G 1/023 |
| 10,968,039 B2 * | 4/2021 | Duppong | A47B 55/02 |
| 11,026,509 B2 * | 6/2021 | Walker | A47B 96/1416 |
| 2002/0130098 A1 | 9/2002 | Simard | |
| 2006/0157435 A1 | 7/2006 | Oberhaus | |
| 2007/0119805 A1 | 5/2007 | Nawrocki | |
| 2008/0073303 A1 | 3/2008 | Li | |
| 2011/0240571 A1 | 10/2011 | Ho | |
| 2011/0290750 A1 | 12/2011 | Lim | |
| 2013/0098856 A1 | 4/2013 | Troyner | |
| 2014/0353271 A1 | 12/2014 | Kruse | |
| 2015/0359335 A1 * | 12/2015 | Offerman | A47B 57/40 211/153 |
| 2016/0051044 A1 * | 2/2016 | Sabounjian | A47B 47/021 211/186 |
| 2017/0208947 A1 | 7/2017 | Tsai | |
| 2018/0084912 A1 | 3/2018 | Yu | |
| 2019/0029416 A1 * | 1/2019 | Lu | A47B 57/482 |
| 2019/0110612 A1 | 4/2019 | Iellimo | |
| 2019/0208904 A1 | 7/2019 | Yu | |
| 2020/0163455 A1 | 5/2020 | Liss | |
| 2021/0032025 A1 | 2/2021 | Iellimo | |
| 2021/0093080 A1 * | 4/2021 | Iellimo | A47B 55/02 |

* cited by examiner

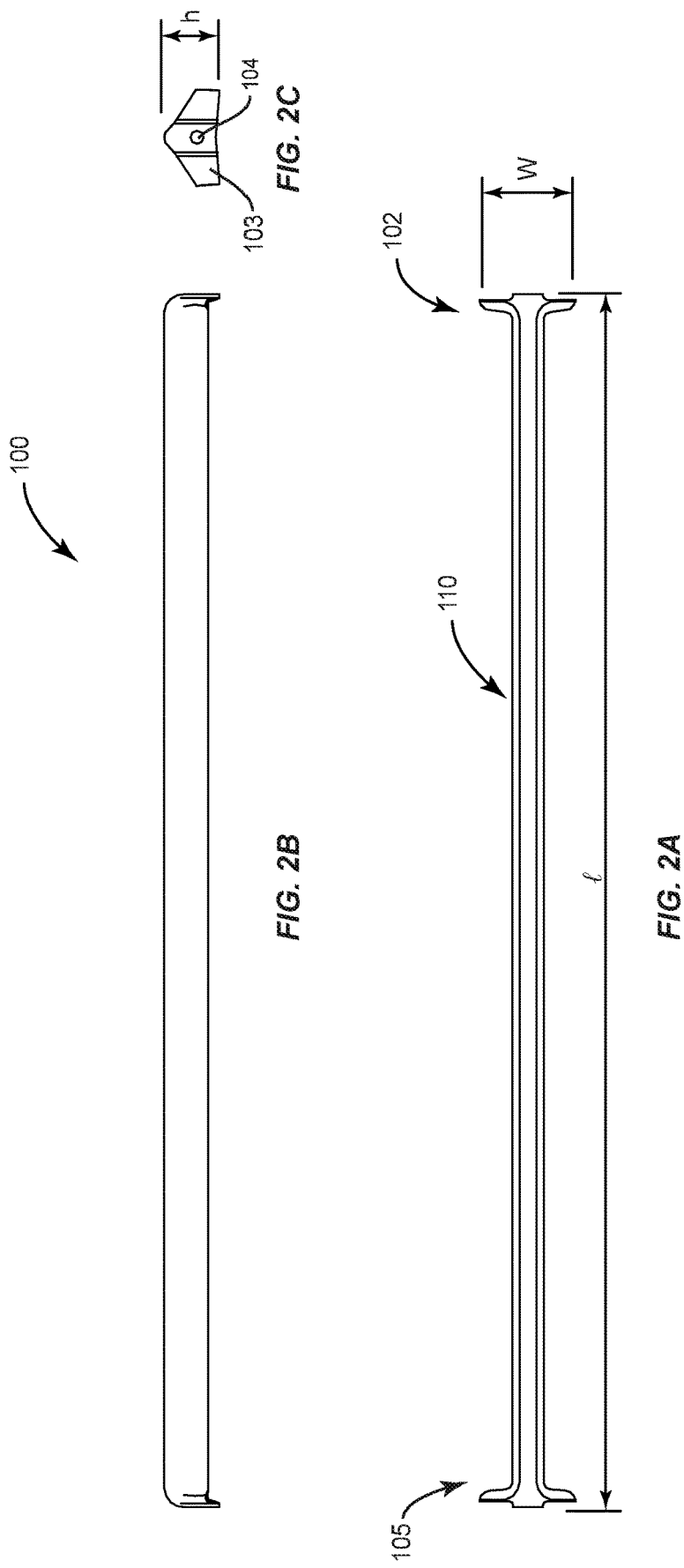

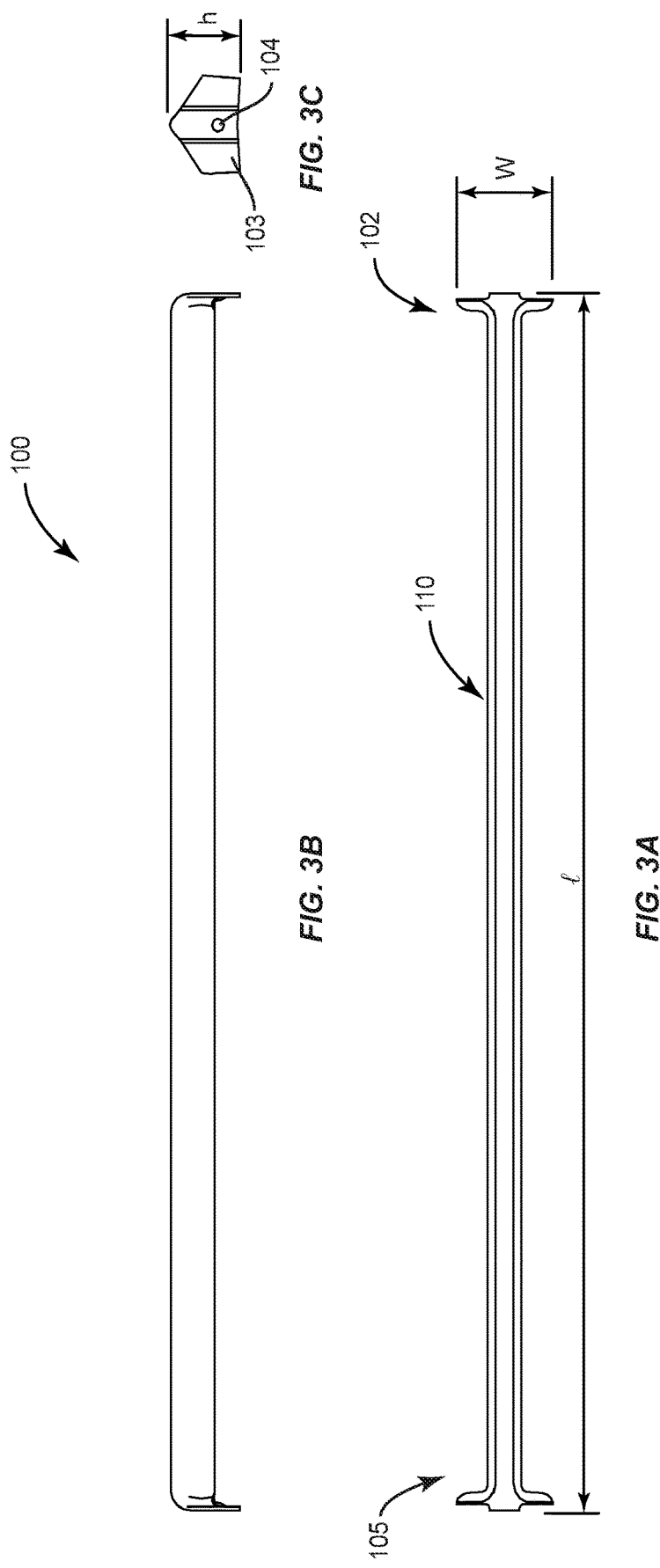

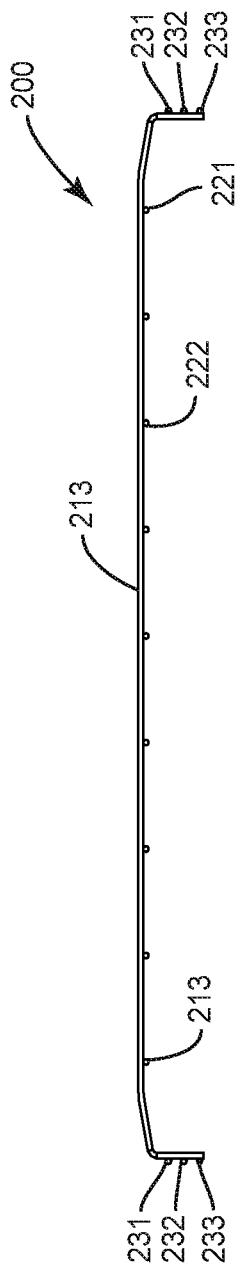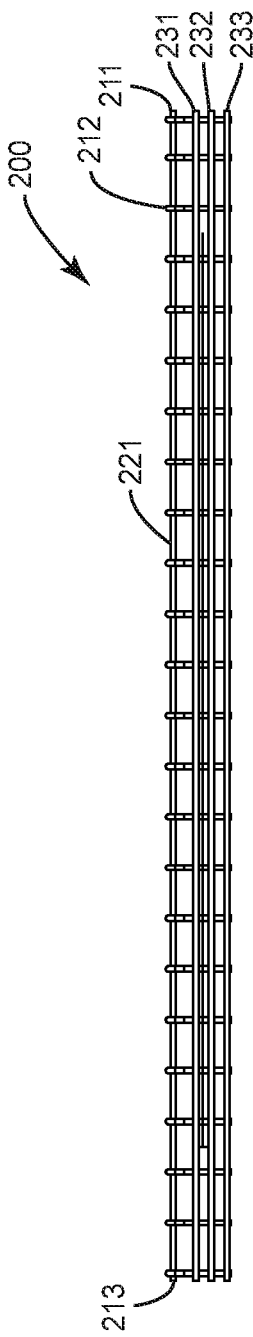

SECTION A-A

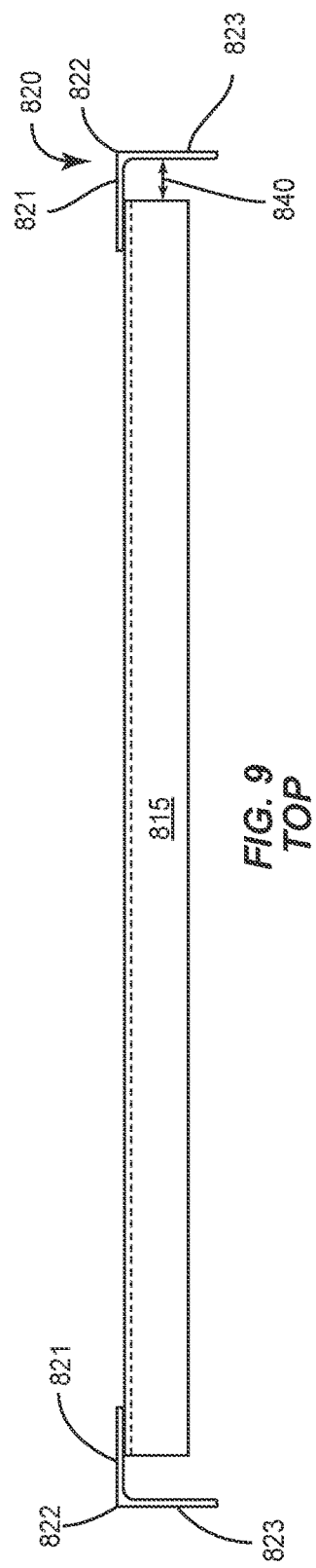
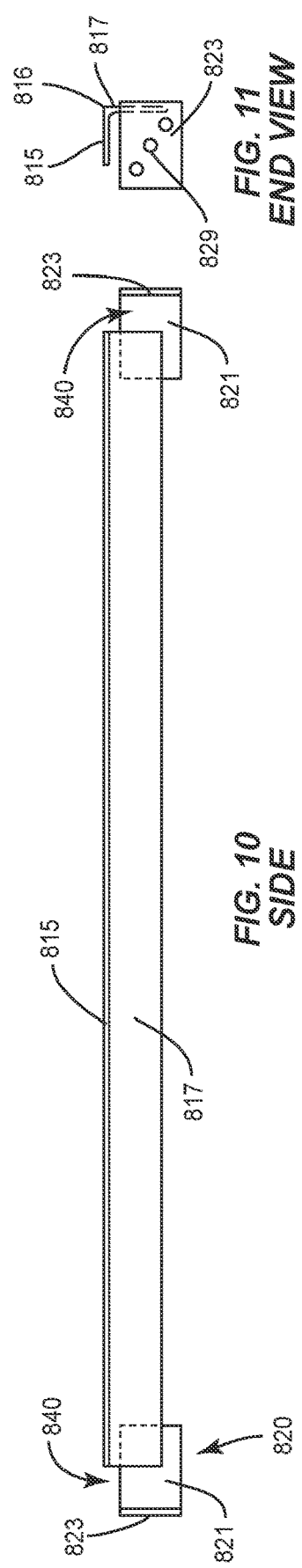
FIG. 9 TOP
FIG. 10 SIDE
FIG. 11 END VIEW

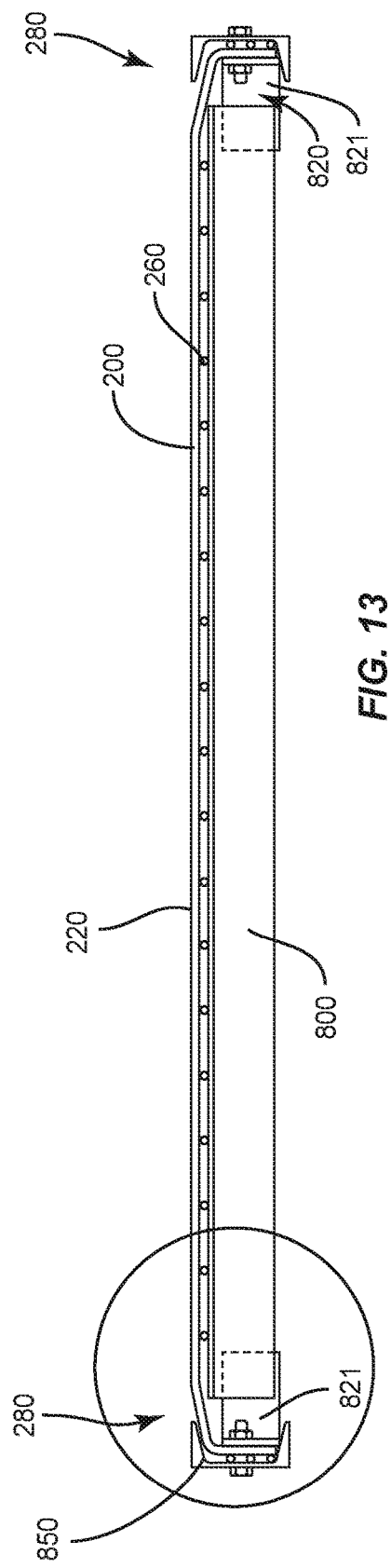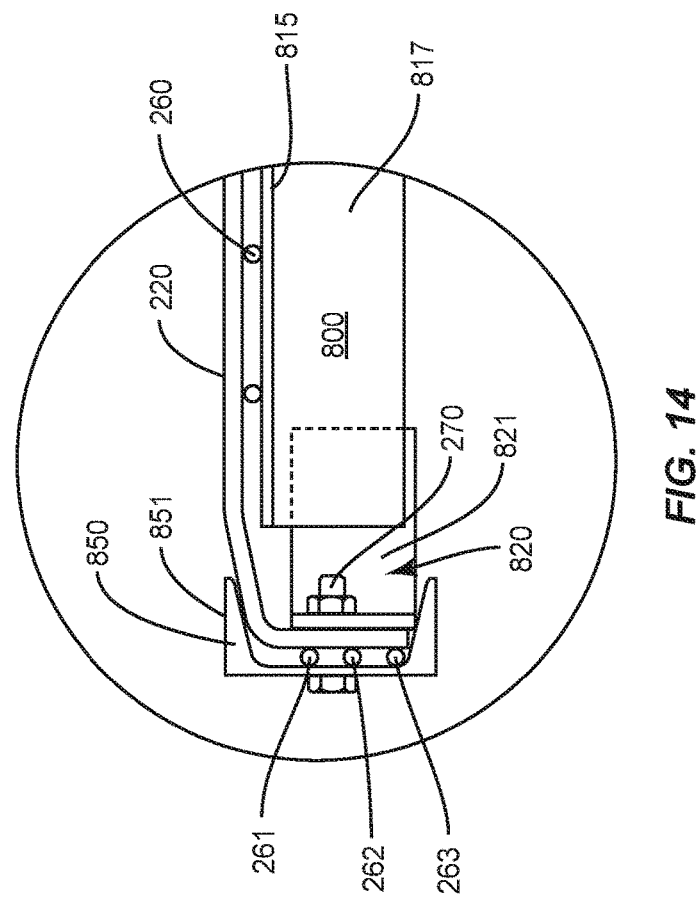
FIG. 13
FIG. 14

STORAGE SUPPORT MEMBER AND GRATING SYSTEM

BACKGROUND OF THE INVENTION

Storage systems are commonly used in warehouses, department stores, and storage facilities to store products thereon. Storage systems containing a plurality of storage racks may hold and support large amounts and often heavy materials. Often, the goods are stored on pallets, which can weigh 3000 pounds or more when fully loaded.

Storage rack systems often employ a number of vertical columns that are sturdily positioned on a base or floor. A plurality of horizontal supporting beams are often fastened to the vertical columns, such as with bolts or rivets. Typically, a number of horizontal support members are positioned directly on and substantially perpendicular to the horizontal supporting beams to provide a supporting surface for shelves, pallets, mesh surfaces, etc.

If the support members are not fastened to the horizontal beams, they can become displaced as items are loaded over the support members or as a storage surface is placed on the support members. Attaching the support members to the horizontal beams can be complicated and can result in structures extending past the edge of the beams. This can interfere with the loading and unloading processes, or snare objects passing by, thereby hindering the stability and reliability of the storage rack.

Accordingly, it is desirable to provide an improved storage surface and method of securing the surface to horizontal beams that overcomes drawbacks of existing systems and methods.

SUMMARY OF THE INVENTION

The invention relates to a rack support system. The rack can be formed with vertical columns with horizontal support beams thereon. Support members can lay across the beams and support a deck as a storage surface for pallets, cartons and the like.

One preferred support member in accordance with the invention can be cold formed. Formed support members in accordance with the invention are constructed to be structurally steady, easy to manufacture and do not interfere with the operations of loading and unloading processes is disclosed herein. The support member can support a storage platform and stay in place as the platform and items are placed thereon.

In one embodiment of the invention, the formed support member comprises a downwardly facing U-shaped body, having a dome shaped cross section and an upwardly pointing apex to serve as a load bearing surface. The U-shaped body has a central section, preferably uniform, that is elongated in an axial direction. The member can be formed by cold or hot working metals such as steel or aluminum, such as by pressing or rolling. The member is preferably formed from a single piece of material. Each end of the support member forms a connection flap and extends from the U-shaped body in a downward direction perpendicular to the longitudinal axis of the support member. The transition from the central section should be curved and non-angular. The connection flap can be formed by cold or hot working, such as rolling, pressing or bending. It preferably has a generally pentagon-like shape and at least one bolt receiving hole therethrough.

The connection flap should have a slightly curved shape at its top, where it transitions from the central section, to substantially conform to the internal concavity of a horizontal I-beam or C-beam, as the horizontal support beam to which it is attached. A first engaging end of the connection flap should have a substantially flat portion to nest against the flat vertical wall of the horizontal beam and having at least one opening, such as a bolt receiving hole. The engaging end can include multiple holes to correspond to multiple sizes of horizontal beams, such as connection holes in the center of 3 inch, 3.5 inch or 4 inch high horizontal beams. The support member can also include a second end extending from the central section in an opposite direction along the same longitudinal axis as the first end. The second end can have a mirror image of the first end as a curved shape to substantially conform to the internal concavity of another C-beam or I-beam horizontal supporting beam. The second end can also have a second engaging end that is substantially flat for engaging the vertical wall of the horizontal support beam and curved at its top to conform to the upper concave portion of the horizontal C-beam or I-beam. The second engaging end can have at least one hole to overlap a hole formed through the horizontal beam. The second engaging end can have multiple holes for use with multiple sized horizontal beams. These inverted U-shaped support beams are best suited for lengths of about 2-4, more preferably 2.5-3.5 feet.

A storage system in accordance with another embodiment of the invention comprises the formed support member disclosed herein having a storage surface, such as a deck or grating thereon. The deck/grating can comprise a plurality of evenly spaced parallel rods or thick wires that are substantially parallel to the formed support members and a plurality of evenly spaced perpendicular rods or thick wires that are substantially perpendicular to the formed support members. The perpendicular rods/wires should be positioned underneath the parallel rods, so that weight on the parallel rods is directly transmitted to the perpendicular rods, which rest directly across the support members. The system can include 2, 3, 4 or more support members depending on the width of the storage surface. The intersections of the parallel rods and the perpendicular rods may be welded, woven or joined by any other conventional methods.

Both ends of a parallel rod should be bent downward to form an upper curved shape and preferably a lower flat shape and substantially conform to the internal concavity of the respective horizontal supporting beam and the curvature of the end of the formed support member, so that the end of the parallel rod fits snugly between the horizontal supporting beam and the formed support member. A bolt can extend through a bolt receiving hole in a vertical wall of the horizontal beam, through the space between rods at the end of the deck/grating, then through the hole in the engaging end of the formed support member. Therefore, no part of the support structure, including the deck, other than the head of a bolt, needs to extend past the outer plane of the horizontal beam.

A deck in accordance with an embodiment of the invention can be configured such that the upper surface formed by the parallel rods is substantially in about the same plane as an upper surface of the horizontal support member, and preferably the upper surface of the horizontal support beams. This facilitates loading goods, pallets and the like onto the deck without obstruction. The support members can be slightly deflected at the transition to the connection flap to lower the load bearing surface at the top of the support member by the thickness of the deck/grating, such that the storage surface is on the same plane as the horizontal beams.

The perpendicular rods should be substantially in contact with the supporting load bearing surface of the formed support member so that the formed support member provides sufficient support to the deck thereon.

The deck can also comprise a set of at least two fastening rods affixed on both ends of the parallel rods. These ends are bent downward, substantially perpendicular to the storage surface. The fastening rods should be substantially parallel to the perpendicular rods and substantially perpendicular to the parallel rods and the formed support member. The fastening rods should be spaced to fit bolts of various sizes between the openings (bolt receiving openings) between the various rods.

The formed support member may comprise one, two, three or more holes through the first engaging end and the second engaging end. The horizontal support beams are typically formed with bolt receiving holes therethrough, typically through the vertical wall, midway between the top and bottom edge/flange. The hole(s) through the first or second engaging end of the support member should be positioned to accommodate differently sized horizontal support beams and decks, so that once a deck is positioned above one or more formed support members, at least one hole through the first or second engaging ends of the formed support member is aligned with a space between two adjacent fastening rods and a hole through the horizontal support beam, for insertion of a bolt to extend through the beam, past the rods and through the engaging end.

Deck/storage surface structures in accordance with the invention can comprise a set of three, four or more fastening rods on both ends of the parallel rods, sized and positioned to accommodate differently sized horizontal support beams and formed support members, so that once a deck is positioned above one or more formed support members, at least one space between two adjacent fastening rods is aligned with a hole through the horizontal support beam, between the rods and through the engaging end of the formed support member.

An angle shaped support member, generally rolled, in accordance with another embodiment of the invention, has a function similar to the inverted U-shaped support member, but can more easily be constructed to have greater strength, to span greater distances between horizontal support beams. This can more conveniently provide deck surfaces of greater area to accommodate larger areas of goods. For example, angle shaped support members can be used to span beam gaps over 4, 5, and even 6 feet and larger.

An angle shaped support member has a generally "L"-shaped cross section. The angle shaped support member can be formed with a top wall, providing a load bearing surface, aligned with a horizontal plane and a vertical wall extending down and perpendicular to the horizontal plane, with a substantially right angle therebetween.

The top wall and vertical wall can be symmetric or can have differing lengths from the vertex in a direction perpendicular to the longitudinal axis of the angle shaped support member. In one embodiment of the invention, the top wall has a width of about 1.5 to 3, preferably about 2 inches perpendicular to the longitudinal axis and the vertical wall has a height of 1.5 to 4 inches, preferably 2, 2.5 or 3 inches perpendicular to the longitudinal axis.

In one embodiment of the invention, an engagement end is formed at both ends of the angle shaped support member by slicing the vertex at the first and second ends of the angle shaped support member. The top surface is then bent downward. The endmost portion of the top surface is bent perpendicular to the longitudinal axis, to present a flat surface facing the horizontal support beam. One or more bolt receiving holes can be formed through the flat surface at the engagement end of the angle shaped support member to overlap a bolt receiving hole through the horizontal support beam. The portion of the vertical surface extending past the slice in the vertex can be cut or bent out of the way.

In another embodiment of the invention, an angle bracket having an attachment arm and an engagement arm at a right angle to the attachment arm is attached to both ends of the angle shaped support member. In one embodiment of the invention, the attachment arm is welded to the outside surface of the vertical wall and the engagement arm extends across the front end of the support member. The engagement arm includes 1, 2, 3, or 4 or more bolt receiving or other holes therethrough and can nest flat, against the vertical wall of the horizontal beam, with the at least one hole overlapping a hole formed through the horizontal beam, for receiving a connection bolt.

Decks/support surfaces in accordance with the invention can be constructed to support more than 3000 pounds. The decks can have a width of about 40-50, preferably 43-47 inches, most preferably about 45⅝ inches and a depth of 37-47 inches, preferably 41-45 inches, most preferably about 43¾ inches. Angle shaped support members can have a top wall of about 1-3 inches, preferably 1.75-2.5 inches, most preferably about 2 inches and a vertical wall about 1.5-3.5, preferably 1.75-3.25 inches, most preferably about 2 or 3 inches. They can have lengths over 30, 40 and even 50 inches. Preferred lengths are 36-48 inches for many applications, although lengths of 4 to 5 feet are acceptable.

Angle brackets in accordance with the invention can have a width of about 2.5-3.5, preferably 3 inches, and an attachment surface to the support member of about 2.5-3.5, preferably 3 inches and a height of about 1.75-2.25, preferably 2 inches. The top of the angle bracket should be positioned lower than the top surface of the angle shaped support member, so that it nests under the upper flange of the horizontal support beam. In addition, room should be provided for the rods of the deck. Therefore, the angle bracket should be positioned low enough so that the upper surface of the support member, with deck thereon, is level with the upper surface of the horizontal support beam, to prevent goods from catching during loading or unloading.

BRIEF DESCRIPTION OF THE DRAWINGS

FIG. 2 illustrates a second embodiment of a formed support member of the storage rack in accordance with aspects of the present disclosure, wherein FIG. 2A is a top view, FIG. 2B is a front view and FIG. 2C is a side view;

FIG. 3 illustrates a third embodiment of a formed support member of the storage rack in accordance with aspects of the present disclosure, wherein FIG. 3A is a top view, FIG. 3B is a side view and FIG. 3C is an end view;

FIGS. 4B and 4C illustrate side views of the deck of the storage rack in accordance with aspects of the present disclosure; and FIG. 4D illustrates a front end view of the deck of the storage rack in accordance with aspects of the present disclosure;

FIG. 9 is a top view of the support member of FIG. 8;

FIG. 10 is a side view of the support member of FIG. 8;

FIG. 11 is a front end view of the support member of FIG. 8;

FIG. 13 is a side view of a support member, bolted to a horizontal support beam and having a deck structure resting thereon, in accordance with an embodiment of the invention;

FIG. 14 is an enlarged partial side view of an end portion of the structure of FIG. 13;

DETAILED DESCRIPTION OF THE PREFERRED EMBODIMENTS

Figure 1:
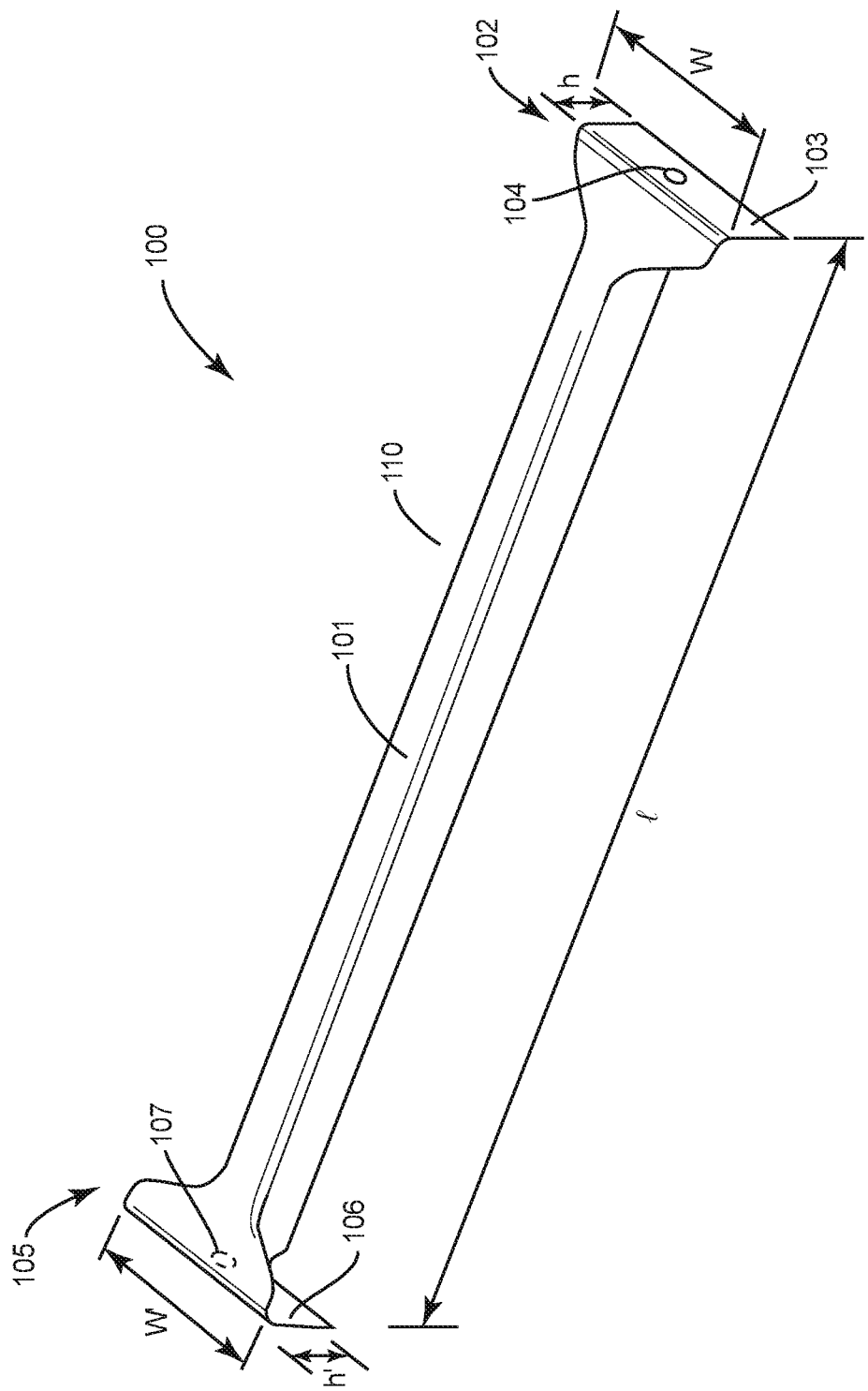
FIG. 1 illustrates a first embodiment of a formed support member of the storage rack in accordance with aspects of the present disclosure.

The present disclosure may be understood more readily by reference to the following detailed description of the disclosure taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Warehouse support structures are commonly used to support heavy loads of 3000 pounds and more. Some are fastened to the inside surface of a horizontal support beam attached to a vertical column. A structural support member in accordance with the invention can span the horizontal support beams and support a platform, such as a mesh platform. The support member can be an inverted formed U or an angle beam. The angle beam should have an attachment bracket secured to each end, at a height to permit the platform to have the same height as the horizontal beam. The mesh platform should nest in the inside surface of the horizontal beam, between the support member and the beam.

The support beam can have a central section having a first end and a second end and an attachment portion extending past and downward from the first or second end. The central section can have a L-shaped cross section, with a top wall extending horizontally from a vertex and a side wall extending vertically from the vertex at a right angle to the top wall. The vertical wall can have a length terminating at the first or second end of the central portion and the attachment portion can comprise an attachment portion of the top wall, at least at the first end of the central section.

In one embodiment of the invention, the top wall can extend past the length of the vertical wall and deflect downward from a plane of the top wall at a first bend and deflects further downward at a second bend, such that after the second bend, the portion of the top wall extending past the first end of the central section extends vertically downward at a right angle to the top wall. At least one bolt receiving holes should be is formed through the attachment portion. A mesh platform can rest on the top wall, the platform having a main portion parallel to the plane of the top wall and edges that curl down from the plane of the top wall and conform to the attachment portion.

The support member can be secured to a horizontal C-beam having a concave surface defined by a top flange, a vertical wall and a bottom flange, wherein the connection portion conforms to the shape of a surface of the top flange and vertical wall of the C-beam faces the connection portion. A bolt can extend, in sequence, through the C-beam, the edge of the mesh platform and the connection portion.

Reference will now be made in detail to the exemplary embodiments of the present disclosure, which are illustrated in the accompanying drawings.

FIG. 1 illustrates a first embodiment of a formed support member of a storage rack in accordance with aspects of the present disclosure. The formed support member 100 comprises a downwardly facing U-shaped body 110 elongated in an axial direction to form a supporting load bearing surface 101. A first end 102 extended from a central section of the U-shaped body in one direction along the axis and has a curved portion to substantially conform to the internal concavity of a horizontal supporting beam and a substantially flat first engaging end 103 with at least one hole 104. On the opposite direction of the first end 102, a second end 105 extends from the central section of the U-shaped body in an opposite direction along the axis and also has a curved portion to substantially conform to the internal concavity of another horizontal supporting beam and a substantially flat second engaging end 106 being with at least one hole 107.

The length l of the formed support member 100 is defined by the shortest distance between the first engaging end 103 and second engaging end 106. The length l is in the range of from 20 to 44 inches, preferably, from 30 to 40 inches. The length l can be shorter or longer than the specifically recited ranges depending on the dimensions of the storage rack.

The width w of the first engaging end 103 and the width w' of the second engaging end 106 are preferably in the range of from 3 to 5 inches. The width w and w' can be shorter or longer than the specifically recited ranges depending on the dimensions of the storage rack, the weight of the load, the material of the formed support member and other unrecited factors.

The height h of the first engaging end 103 and the height h' of the second engaging end 106 are in the range of from 1 to 4 inches. The height h and h' can be shorter or longer than the specifically recited ranges depending on the dimensions of the storage rack, the weight of the load, the material of the formed support member and other unrecited factors.

FIG. 2 illustrates a second embodiment of a formed support member of the storage rack in accordance with aspects of the present disclosure. The specific dimensions of the formed support member are provided in FIG. 2A, which is a top view, FIG. 2B, which is a front view and FIG. 2C, which is a side view. In particular, the length l of the formed support member can be 38 to 42 inches. In one example, the length is 41 3/16 inches. The width w of the first engaging end 103 can be 2.5 to 4 inches. In one example, 3 1/4 inches. The height h of the first engaging end 103 can be 1.5 to 2.5 inches, in one example, 1 7/8 inches.

FIG. 3 illustrates a third embodiment of a formed support member of the storage rack in accordance with aspects of the present disclosure. The specific dimensions of the formed support member are provided in FIG. 3A, which is a top view, FIG. 3B, which is a front view and FIG. 3C, which is a side view. In particular, the length l of the formed support member is 41 3/16 inches, the width w of the first engaging end 103 is 3 1/4 inches, and the height h of the first engaging end 103 is 2 3/8 inches.

Figure 4A:
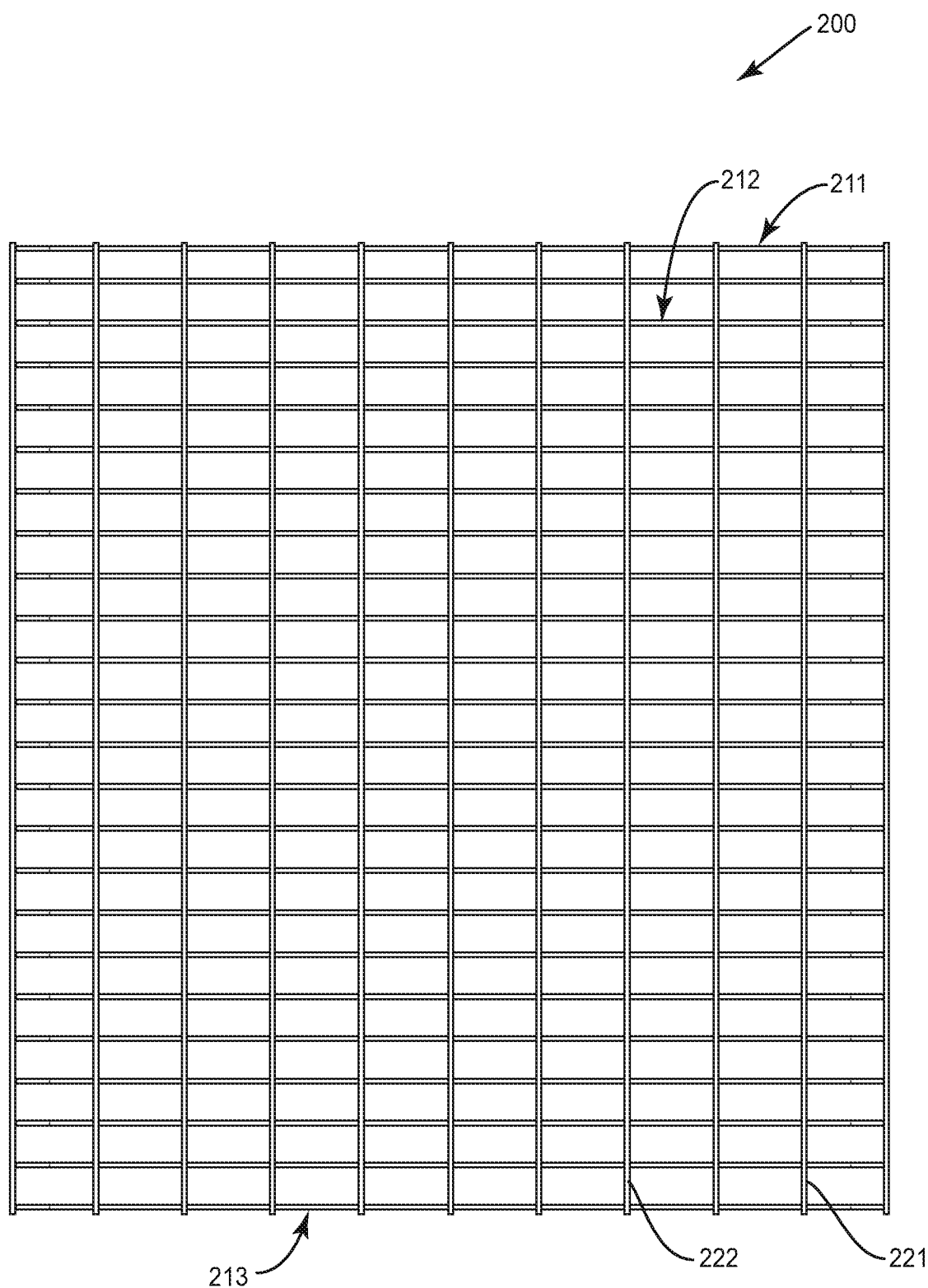
FIG. 4A illustrates a top view of a deck of a storage rack in accordance with aspects of the present disclosure.

FIG. 4A illustrates a top view of a deck structure 200, in the form of a mesh of thick wires for a storage rack in accordance with aspects of the present disclosure. Deck 200 comprises a plurality of evenly spaced parallel rods (e.g., thick wires), for example, 211, 212, 213, etc., that are substantially parallel to the formed support members (not shown) and a plurality of evenly spaced perpendicular rods, for example, 221, 222, etc., that are substantially perpendicular to the formed support members (not shown). The perpendicular rods are positioned underneath the parallel rods to rest on the formed support members, with the parallel rods thereon. The intersections of the parallel rods and the perpendicular rods may be welded or joined by any other conventional methods. The perpendicular rods shown in FIG. 4A can have a length of 46 1/8 inches.

FIGS. 4B and 4C both illustrate front views of deck 200. FIG. 4D illustrates a side view of deck 200. As shown in FIG. 4B, both ends of the parallel rods 213 are bent to extend downwardly to form a curved shape and substantially conform to the internal concavity of a horizontal supporting C-beam or I-beam (not shown) and the curvature of a formed support member (not shown) so that at least a portion of the ends of the parallel rods are snugly fitted between the horizontal supporting beam and the connection ends of the formed support member. The perpendicular rods, for example, 221 and 222, are positioned underneath the parallel rod 213.

As shown in FIG. 4D, deck 200 further comprises a set of two or three (or otherwise) fastening rods, for example, 231, 232 and 233, affixed on both ends of the parallel rods. The fastening rods 231, 232 and 233 are substantially parallel to the perpendicular rods, for example, 221, and substantially perpendicular to the parallel rods, for example, 211, 212 and 213. The fastening rods are spaced to fit bolts of various sizes through the gaps therebetween. As shown in FIG. 4B, the distance between the fastening rods on both ends of a parallel rod is 41 3/16 inches.

Figure 5A:
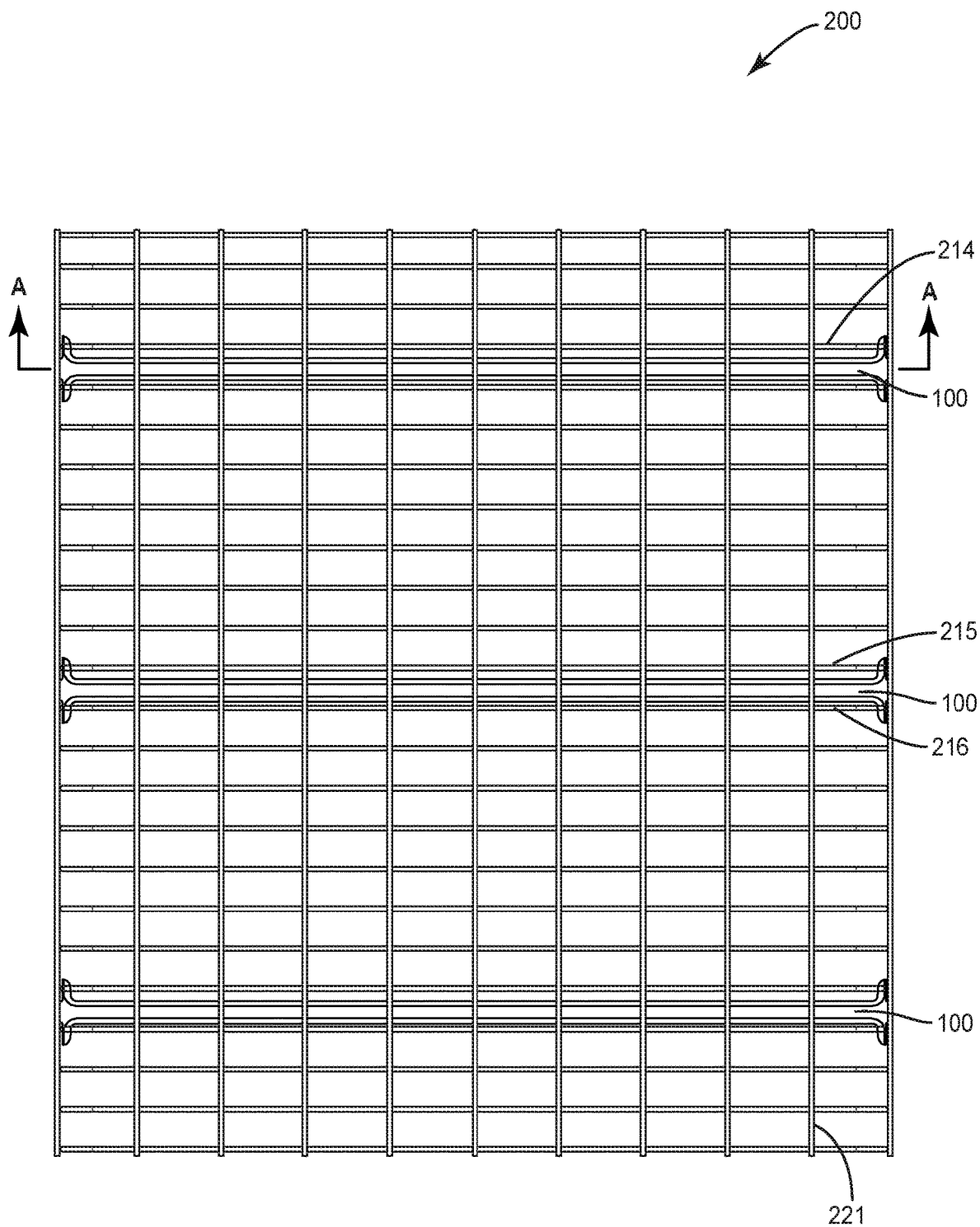
FIG. 5A illustrates a top plan view of a system comprising a deck of a storage rack positioned on three formed support members in accordance with aspects of the present disclosure.

FIG. 5A illustrates a top view of a system comprising deck 200 positioned on three formed support members 100 in accordance with aspects of the present disclosure. Deck 200 is positioned on three evenly spaced formed support members 100 as described above.

Figure 5B:
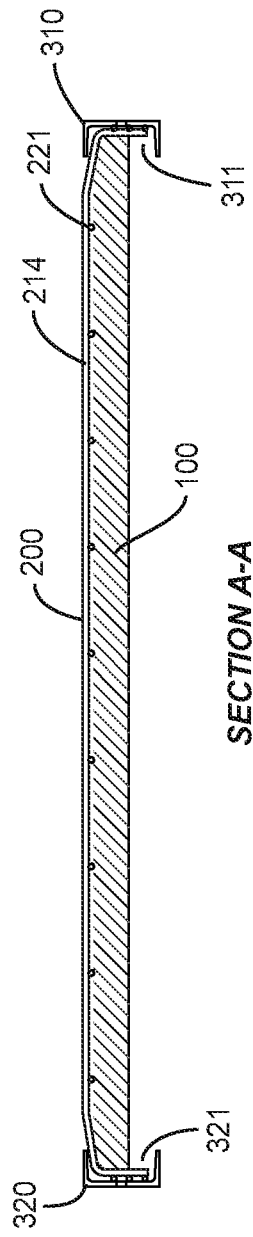
FIG. 5B illustrates a cross sectional view of the deck and one of the three formed support members in accordance with aspects of the present disclosure.

FIG. 5B illustrates a cross sectional view along plane "A" of deck 200 and one of the three formed support members 100 in accordance with aspects of the present disclosure. Both ends of the parallel rods 214 extend downwardly to form a curvature shape and substantially conform to an internal concavity 311 or 321 of a horizontal supporting beam 310 or 320, respectively, and the curvature of formed support member 100, so that at least a portion of the end of the parallel rods are snugly fitted between horizontal supporting beam 310 and 320 and connecting ends of formed support member 100.

As shown in FIG. 5B, parallel rods, for example, 214, may comprise a downward slope in a representative length of 2 1/2 inches, so the top surface of the horizontal supporting beams 310 and 320 and the top surface of the parallel rods, for example, 211, 212, 213 and 214, of the deck 200, altogether form a flat surface to support the loads. Since the formed support members 100 are securely fastened and protected by the deck 200 and the horizontal supporting beams 310 and 320, the system claimed herein is structurally steady and does not interfere with the operations of loading and unloading.

The deck is configured such that the upper storage surface formed by the parallel rods is substantially in the same plane as an upper surface of the horizontal support member.

Figure 5C:
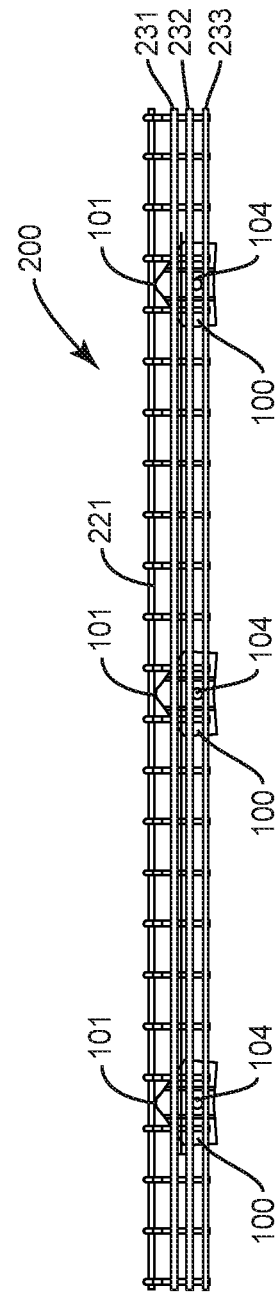
FIG. 5C illustrates a front end view of the deck positioned on three formed support members in accordance with aspects of the present disclosure.

FIG. 5C illustrates a front end side view of the deck being positioned and supported by three formed support members 100 in accordance with aspects of the present disclosure. The perpendicular rods, for example, 221, are substantially in contact with supporting surface 101 of formed support members 100 so that the formed support member provides sufficient support to the deck 200 above.

As shown in FIG. 5C, all three formed support members 100 have one hole 104, and deck 200 has three fastening rods 231, 232 and 233. The holes 104 on the formed support members 100 are aligned with the bolt receiving space between fastening rods 232 and 233 to receive a bolt therethrough to fasten member s 100 to a horizontal support beam, not shown.

Figure 6A:
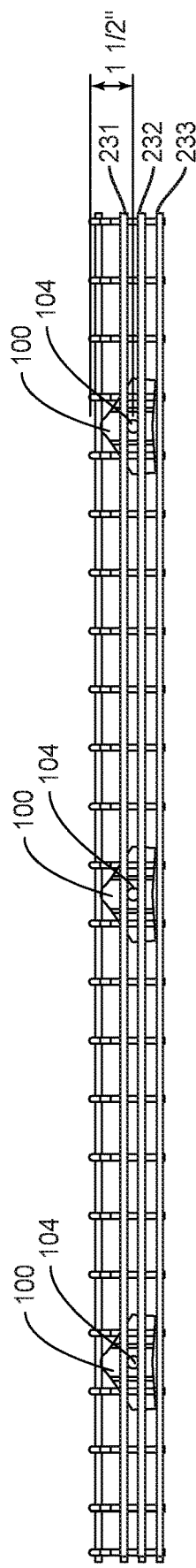
FIGS. 6A and 6B illustrate front end views of a second embodiment of a system comprising a deck of a storage rack positioned on three formed support members in accordance with aspects of the present disclosure.
Figure 6B:
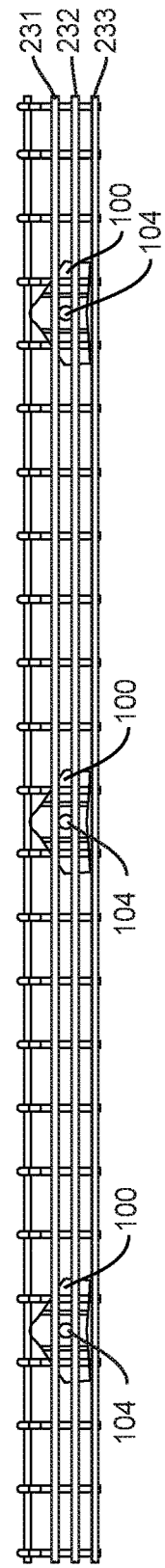

FIGS. 6A and 6B illustrate front end side views of a second embodiment of a system comprising a deck of a storage rack positioned on three formed support members 100 in accordance with aspects of the present disclosure. In this embodiment of the system, holes 104 on formed support members 100 are aligned with the space between fastening rods 231 and 232.

Figure 7A:
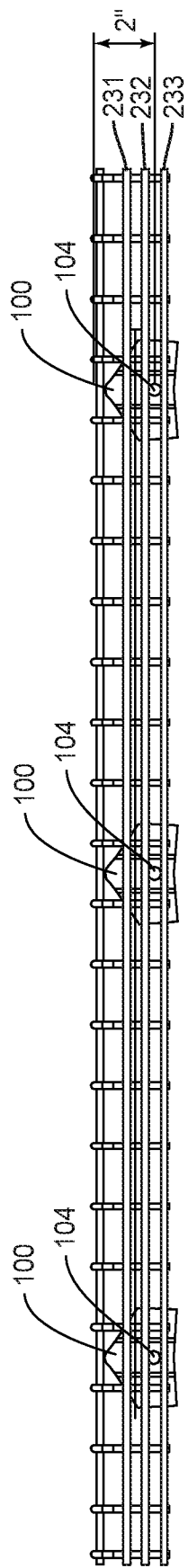
FIGS. 7A and 7B illustrate front end views of a third embodiment of a system comprising a deck of a storage rack positioned on three formed support members in accordance with aspects of the present disclosure.
Figure 7B:
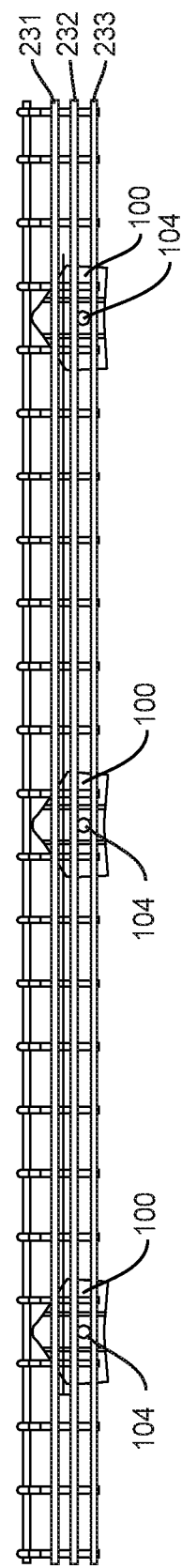
Figure 8:
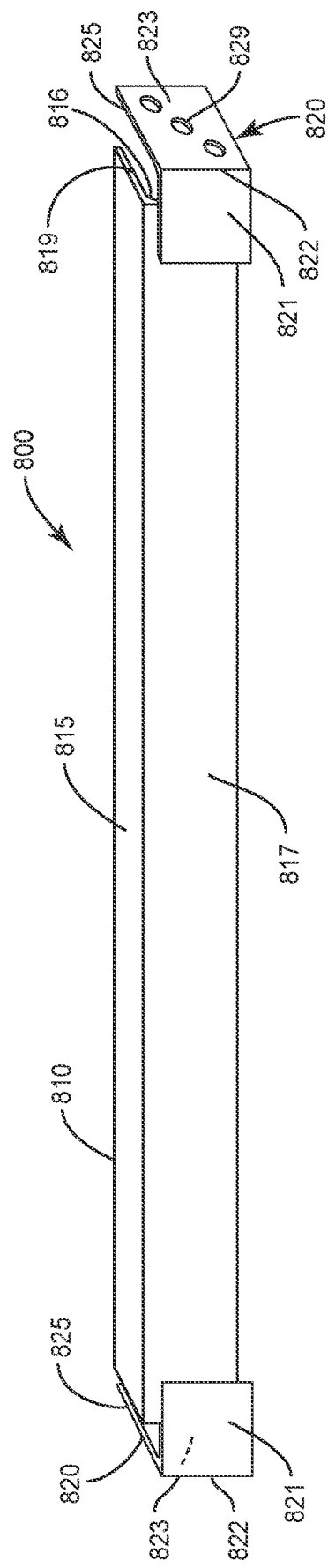
FIG. 8 is a perspective view of a support member in accordance with a preferred embodiment of the invention.

FIGS. 7A and 7B illustrate side views of a third embodiment of a system comprising a deck of a storage rack positioned on three formed support members in accordance with aspects of the present disclosure. In this embodiment of the system, the holes on the formed support members are aligned with the space between fastening rods 232 and 233.

The formed support member 100 may comprise one, two or three (or more) holes on the first engaging end and the second engaging end to accommodate different sized horizontal supporting beams and decks so that once a storage surface deck is positioned above one or more formed support members, at least one hole on the engaging ends of the formed support member is aligned with a space between two adjacent fastening rods for insertion of a bolt. Similarly, the deck may comprise a set of two, three, four or more fastening rods on both ends of the parallel rods to accommodate different sized horizontal supporting beams and formed support members, so that once a deck is positioned above one or more formed support members, at least one space between two adjacent fastening rods is aligned with a hole on the engaging ends of the formed support member.

In further embodiments of the invention, a formed support member having two holes on the engaging ends and a deck being assembled in accordance with aspects of the present disclosure is provided. The holes are configured to permit proper attachment to and alignment with either a 3" horizontal support member or a 4" horizontal support member, while maintaining proper support for the deck.

In a further embodiment of the formed support member of the present invention, the width w of the first engaging end 103 and the width w' of the second engaging end 106 are reduced so that the entire first engaging end 103 and the entire second engaging end 106 are positioned between two parallel rods, for example, 215 and 216 in FIG. 5A, so that any possible rotation introduced during the fastening process would be avoided or at least partially reduced.

The formed support member and storage surface grating can be fabricated from suitable materials, including, but not limited to, metal(s), including alloy(s), or combinations thereof, etc. Suitable metals include aluminum, copper, iron, tin, lead, titanium, zinc and etc. Suitable alloys including steel, solder, brass, pewter, duralumin, bronze, amalgams and etc. The formed support member may be fabricated from a single material or a combination of materials, including, but not limited to, the above exemplary materials, to achieve various desired characteristics such as strength, rigidity, performance and durability. Preferred support members are formed from a single piece of metal material.

The present disclosure is advantageous because the ends of the grating and the ends of the underneath formed support members are embraced by the horizontal supporting beams of a storage rack. As shown in FIG. 3, the exposed portion of the grating forms a flat supporting surface substantially in the same plane defined by the top surface of the horizontal supporting beams. Problems of formed support members being interfere with the loading and unloading processes are reduced, thereby improving the stability and reliability of the storage rack.

A heavy-duty support member 800 in accordance with another embodiment of the invention is shown generally in FIGS. 8-11. Heavy-duty support member 800 is more conveniently constructed to support heavier loads and span greater distances between horizontal support beams, as compared to formed supporting member 100. Support member 800 has the cross section of an angle bracket and a central support section 810 in the form of an angle beam. Central section 810 includes a horizontal top wall 815 and a vertical side wall 817. Top wall 815 defines a substantially flat, horizontal load bearing surface and side wall 817 depends vertically, and a right angle, from top wall 815. The cross section of central section 810 has the shape of an "L", with top wall 815 meeting side wall 817 at a vertex 816.

Figure 15:
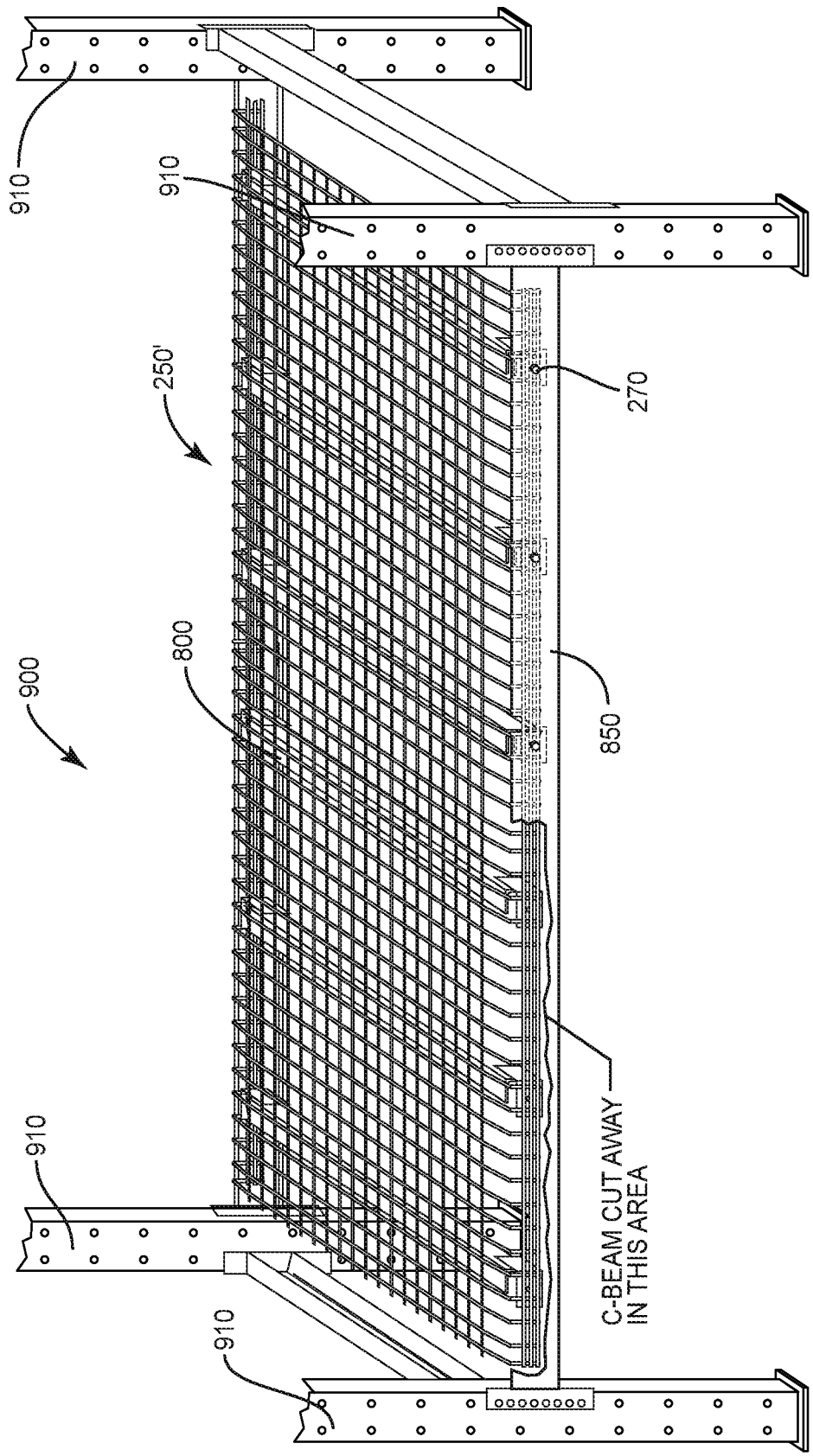
FIG. 15 is a perspective partial cut away view of multiple deck structures supported by multiple support members supporting multiple deck structures, attached to horizontal support beams and supported by vertical columns, in accordance with an embodiment of the invention.

Support member 800 includes a connection bracket 820 at both ends thereof, to secure support member 800 to a horizontal support beam, as illustrated, for example, in FIGS. 13-15. Connection bracket 820 has the shape and construction of an angle bracket, and includes a connection arm 821 connected to an engagement arm 823, joined at a bracket vertex 822. Connection arm 821 of connection bracket 820 can be welded or otherwise attached to central section 810.

Preferably, connection arm 821 is joined to an outer surface of side wall 817. An upper edge 825 of connection bracket 820 should be offset from the top surface of horizontal top wall 815. In addition, connection bracket 820 should be offset from an end 819 of central section 810 with an offset gap 840. This permits heavy-duty support member 800 to nest in the concave recess of a C-beam (or I-beam) with the top flange of the C-beam extending into the gap, so that engagement arm 823 can be flat with the horizontal wall of the C-beam and top wall 815 can be on the same plane as the top flange of the C-beam. One or more bolt receiving holes 829 is provided to secure support member 800 to the horizontal support beam.

Figure 12:
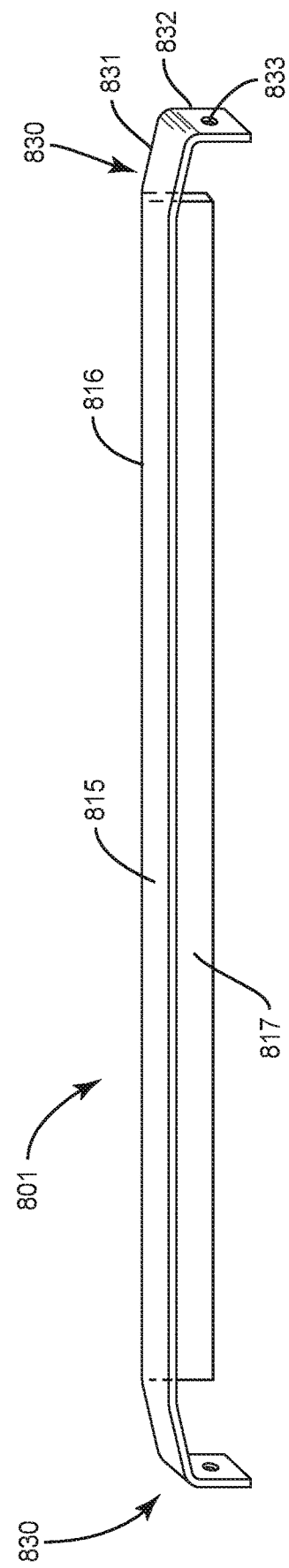
FIG. 12 is a perspective view of a support member in accordance with another embodiment of the invention.

Another embodiment of the heavy-duty support member is shown generally as support member 801 in FIG. 12. Support member 801 includes a top wall 815 meeting at side wall 817 at a vertex 816, as in support member 800. However, rather than attach a separate connection bracket 820, support member 801 includes a formed engagement end 830.

Support members 800 and 801 are preferably 30 to 50 inches long, preferably 36-48 inches long or more. Lengths of 4 to 5 feet and longer are possible.

Engagement end 830 is formed by slicing the ends of vertex 816 to form a horizontal flap 831 of top wall 815 and a vertical flap of side wall 817. The vertical flap can be trimmed, as in FIG. 12 or bent out of the way. Horizontal flap 831 is initially bent downward, to conform to the inner concave surface of the C-beam where horizontal flap 831 extends from top wall 815 and is bent further, to form an engagement surface 832 with a bolt receiving hole 833 therethrough. engagement surface 832 is formed to conform to the flat vertical wall of the C-beam, to join heavy-duty support member 801 to the horizontal support beam.

FIGS. 13 and 14 depict a support member 800 having a storage surface deck structure 250 thereon. Deck structure 250 includes an array of lower perpendicular rods 260, with an array of upper parallel rods 270 perpendicular to rods 260. Rods 260 can be welded or otherwise joined to rods 270 in form a rectangular mash to support pallets, cartons and other merchandise thereon. Each end 280 of deck 250 is bent downward, to conform to the inner concave shape of a horizontal support beam 850. Ends 280 of deck 250 include a plurality of engagement rods 261, 262 and 263. A bolt 270 is inserted through a bolt receiving hole through horizontal support beam 850, in a bolt receiving space between two of the engagement rods 261 and 262 and through bolt receiving hole 829 through engagement bracket 820. The various parts should be sized, arranged and configured, so that an upper surface of parallel rods 270 conforms to an upper surface 851 of horizontal support beam 850. This will help facilitate loading and unloading of objects from deck 250.

Figure 16:
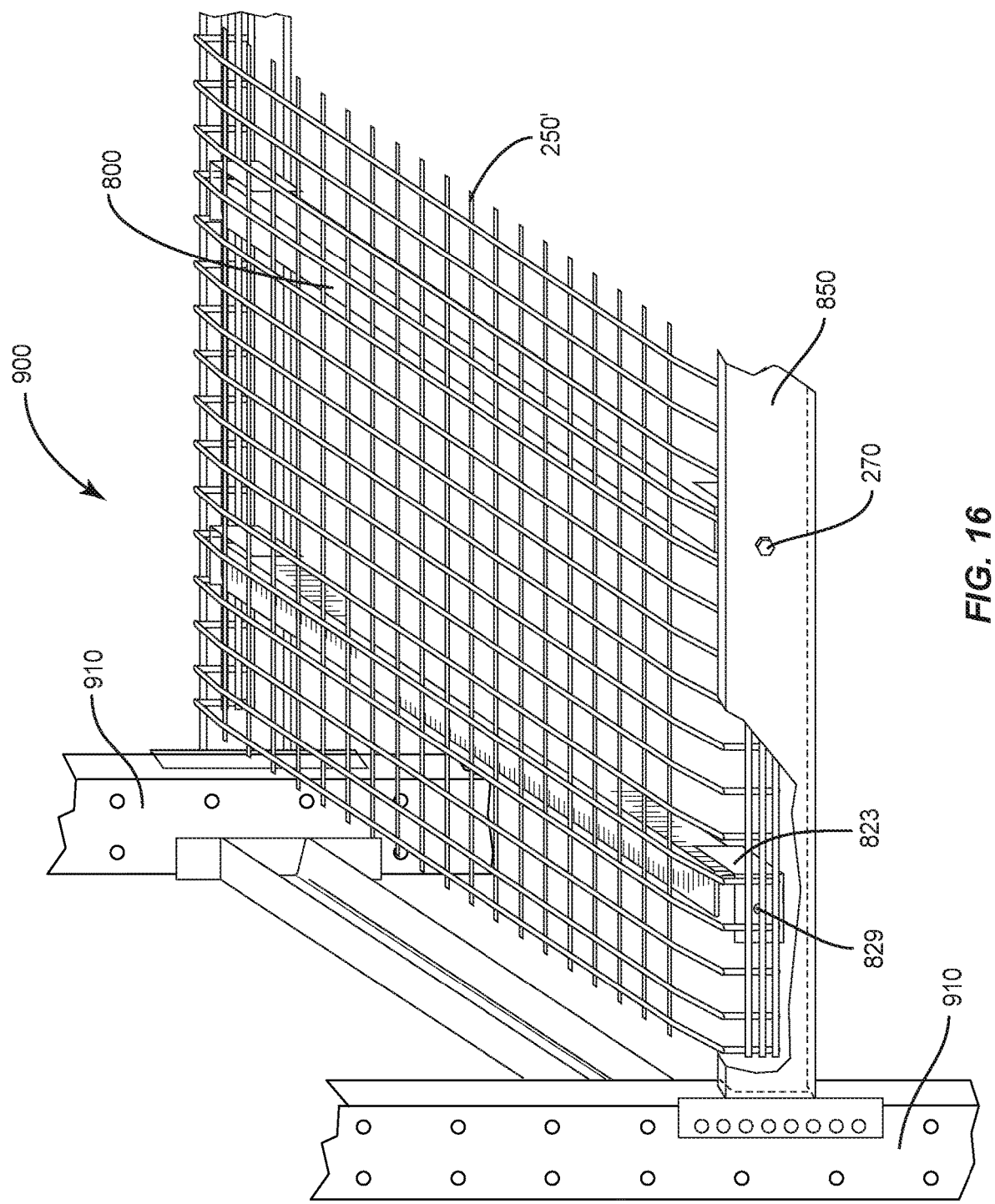
FIG. 16 is an enlarged partial cut away perspective view of the structures depicted in FIG. 15.
Figure 17:
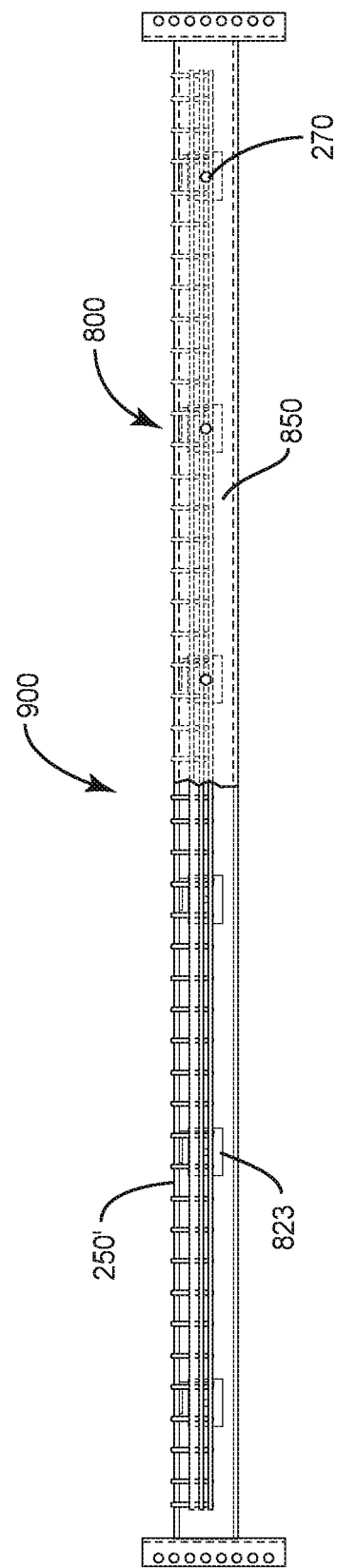
FIG. 17 is a partial cut away side view of the structure of FIG. 15.

All a fully assembled storage system 900 is shown generally in FIGS. 15-17. Storage system 900 includes a plurality of vertical columns 910 which are stabley secured to a substrate floor surface. A plurality of horizontal beams 850 are bolted, or otherwise secured to columns 910. A plurality of support members 800 are secured to horizontal beams 850. A deck structure 250' rests on support members 800. The ends of deck structure 250' bend downward, and fit between engagement ends 823 of support members 850. A bolt 270 extends through a bolt receiving hole through horizontal beam 850, between engagement rods 261 and 262 of deck 250' and through hole 829 on the engagement surface 823 of engagement bracket 820.

Alternative embodiments of support members having two holes on the engaging ends and a deck being assembled in accordance with aspects of the present disclosure. The holes can be configured to permit proper attachment to and alignment with either a 3, 3.5, or 4 inch horizontal support member, while maintaining proper support for the deck.

In a further embodiment of the formed support member of the present invention, the width w of the first engaging end and the width w' of the second engaging end are reduced, so that the entire first engaging end 10 and the entire second engaging end are positioned between two parallel rods, for example, 215 and 216 in FIG. 5A, so that any possible rotation introduced during the fastening process would be avoided or at least partially reduced.

The formed support member and grating can be fabricated from suitable materials, including, but not limited to, metal (s), alloy(s), or combinations thereof, etc. Suitable metals include aluminum, copper, iron, tin, lead, titanium, zinc and etc. Suitable alloys including steel, solder, brass, pewter, duralumin, bronze, amalgams and etc. The formed support member may be fabricated from a single material or a combination of materials, including, but not limited to, the above exemplary materials, to achieve various desired characteristics such as strength, rigidity, performance and durability.

The present disclosure is advantageous because the ends of the grating and the ends of the underneath formed support members are embraced by the horizontal supporting beams of a storage rack. As shown in FIG. 3, the exposed portion of the grating forms a flat supporting surface substantially in the same plane defined by the top surface of the horizontal supporting beams. The problems of formed support members interfering with the loading and unloading processes are reduced, thereby improving the stability and reliability of the storage rack.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

The invention claimed is:

1. A storage system, comprising:
a first and a second horizontal support beam, each having a concave inner surface facing the concave inner surface of the other support beam;
a plurality of support members coupled to the support beams, perpendicular to the support beams and extending from the first support beam to the second support beam, the support members having a central section with a load bearing upward facing surface and first and second ends, and first and second connection portions extending, respectively, from each end of the central section, the first and second connection portions adapted to be secured to the concave inner surface of the first and second support beams, at least one of the support members having an L-shaped cross section, with a flat upper wall and a vertical wall extending downward from a vertex with the upper wall and the first and second connection portions of the at least one support member comprises an L-shaped metal piece welded to the vertical wall;
a deck structure with an upward facing storage surface on the load bearing surface, the deck structure having a first edge along the first support beam and a second edge along the second support beam, the first and second edges extending downward with respect to the storage surface;
the first and second edges of the deck structure nested along the concave inner surface of the first and second support beams, respectively, and the first and second connection portions nested along the first and second edges, respectively, and the first and second connection portions are secured to the respective first and second support beams with the respective first and second edges therebetween.

2. The storage system of claim 1, wherein a bolt extends through the first support beam, the first edge and the connection portion, in that order, with the head of the bolt outside the support beam.

3. The storage system of claim 1, wherein the deck is formed of a plurality of lower rods perpendicular to the support members and a plurality of upper rods, on the lower rods, perpendicular to the lower rods, the upper rods extending downward at the first and second edges.

4. The storage system of claim 1, wherein the support member is 30 to 50 inches long.

5. The storage system of claim 4, wherein the flat upper wall to about 1-3 inches wide.

6. The storage system of claim 1, wherein the support beams are C-beams having an inner facing concave surface defined by a top flange, a vertical wall and a bottom flange, wherein the first and second edges of the deck structure conform to the shape of a surface of the top flange and vertical wall of the C-beam.

7. The storage system of claim 1, wherein the deck structure has a width in the direction from the first to the second support beam of at least 40 inches.

8. The storage system of claim 1, wherein the central section has a uniform cross section.

9. The storage system of claim 1, wherein the connection portion includes at least 3 bolt receiving holes, each a different distance below the load bearing surface.

10. The storage system of claim 1, comprising at least 3 of the support members.

11. The storage system of claim 3, wherein the rods are formed of steel.

12. The storage system of claim 4, wherein the support members are formed from steel.

13. The storage system of claim 1, wherein the support members are formed from steel.

14. The storage system of claim 1, adapted to support a 3000 pound pallet of goods.

15. The storage system of claim 1, wherein the deck structure is about 40-50 inches wide.

16. A storage system, comprising:
a deck structure with an upward facing storage surface, the deck structure having a first side and a second side opposite and parallel to the first side, a first edge extending downward from the first side and a second edge extending downward from the second side;
a plurality of support members, perpendicular to the first and second sides, the support members having a central section with a load bearing upward facing surface supporting the deck structure, and first and second ends, with first and second connection portions extending, respectively, from each end, the first and second connection portions adapted to be secured to the concave inner surface of a horizontal C-beam, at least one of the support members having an L-shaped cross section, with a flat upper wall and a vertical wall extending downward from a vertex with the upper wall and the first and second connection portion of the at least one support member comprises an L-shaped metal piece welded to the vertical wall;

the first and second connection portions nested along the first and second edges, respectively, and the first and second connection portions are securable to the C-beams.

17. The storage system of claim 16, wherein the support member is over 40 inches long.

18. The storage system of claim 16, wherein the flat upper wall is about 1-3 inches wide and the vertical wall is about 1.5 to 3 inches tall.

* * * * *